(12) United States Patent
Takimoto (10) Patent No.: US 8,424,080 B2
(45) Date of Patent: Apr. 16, 2013

(54) ELECTRONIC DEVICE AND AUTHENTICATION METHOD OF ELECTRONIC DEVICE

(75) Inventor: Norihiro Takimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 136 days.

(21) Appl. No.: 12/892,689

(22) Filed: Sep. 28, 2010

(65) Prior Publication Data
US 2011/0078788 A1 Mar. 31, 2011

(30) Foreign Application Priority Data
Sep. 28, 2009 (JP) ................. 2009-223526

(51) Int. Cl.
*G06F 21/00* (2006.01)

(52) U.S. Cl.
USPC ........ 726/19; 726/2; 726/16; 726/17; 726/18; 726/20; 713/168; 713/169; 713/170; 713/171; 713/172; 713/173; 713/174; 713/175; 713/176; 713/177; 713/178; 713/179; 713/180; 713/181; 713/182; 713/183; 713/184; 713/185; 713/186

(58) Field of Classification Search .............. 726/17–20; 713/168–186
See application file for complete search history.

(56) References Cited

U.S. PATENT DOCUMENTS

| | | | | |
|---|---|---|---|---|
| 8,006,300 | B2 * | 8/2011 | Mizrah | 726/20 |
| 8,166,530 | B2 * | 4/2012 | Adams et al. | 726/9 |
| 8,239,937 | B2 * | 8/2012 | Bedworth | 726/18 |
| 8,311,530 | B2 * | 11/2012 | Kornilovsky et al. | 455/418 |
| 2005/0138390 | A1 * | 6/2005 | Adams et al. | 713/185 |
| 2008/0184360 | A1 * | 7/2008 | Kornilovsky et al. | 726/17 |
| 2009/0193151 | A1 * | 7/2009 | Adams et al. | 710/5 |

FOREIGN PATENT DOCUMENTS
JP 2002-142010 5/2002

* cited by examiner

*Primary Examiner* — David García Cervetti
*Assistant Examiner* — Ghazal Shehni
(74) *Attorney, Agent, or Firm* — Procopio, Cory, Hargreaves & Savitch LLP (57) ABSTRACT

An authentication method of an electronic device is disclosed. A plurality of key inputs is received from a user via activation of input keys. At least one key input from the key inputs is validated based on a predefined criterion to obtain a password. The password is compared to a registered password to obtain an authenticated password.

12 Claims, 7 Drawing Sheets

| | | | | | | | |
|---|---|---|---|---|---|---|---|
| (A) Valid/invalid determination | Valid | Invalid | Invalid | Invalid | Valid | Valid | Valid |
| (B) Screen display | ● | ● | ● | ● | ● | ● | ● |
| (C) Key input | 1 | 2 | 3 | 4 | 2 | 3 | 4 |
| (D) Side key input | Not pressed | Pressed | Pressed | Pressed | Not pressed | Not pressed | Not pressed |
| (E) Buffer memory | 1 | 1 | 1 | 1 | 12 | 123 | 1234 |

ELECTRONIC DEVICE AND AUTHENTICATION METHOD OF ELECTRONIC DEVICE

CROSS-REFERENCE TO RELATED APPLICATION

The present application claims priority under 35 U.S.C. §119 to Japanese Patent Application No. 2009-223526, filed on Sep. 28, 2009, entitled "ELECTRONIC DEVICE". The content of which is incorporated by reference herein in its entirety.

FIELD

Embodiments of the present disclosure relate generally to mobile electronic devices, and more particularly relate to an authentication process for mobile electronic devices.

BACKGROUND

Many mobile phones can perform an authentication process such as entering a password before providing access to a service or function of a mobile phone. For example, the authentication process may comprise comparing the password to a registered password stored in a memory of the mobile phone. When a user performs the authentication process, password information should not be easily viewed by others. A user generally inputs a password by operating input keys to perform the authentication process, and operation of the input keys by the user may be viewed by others. Thereby, the password may become known to the others.

SUMMARY

An electronic device is disclosed. A plurality of characters comprising password characters and non-password characters are received from a user via input keys. The password characters are distinguished from the non-password characters based on a predefined criterion prior to authentication. In this manner, an actual password is decoyed by the non-password characters; thereby an observer observing the user inputting a password may not detect the actual password.

In a first embodiment, an electronic device comprises an operational module comprising a plurality of input keys. The electronic device further comprises a control module operable to perform authentication by: receiving a plurality of key inputs from a user via activation of the input keys, validating at least one key input from the key inputs based on a predefined criterion to obtain a password, and comparing the password to a registered password.

In a second embodiment, an electronic device comprises a housing, a plurality of input keys located on a front surface of the housing, and a side key located on a side surface of the housing. The electronic device further comprises a memory module operable to store a registered password. The electronic device also comprises a control module operable to perform an authentication by: receiving a plurality of key inputs from a user via activation of the input keys, validating at least one key input from the key inputs to obtain a password, if the side key is not activated before receiving the at least one key input, and comparing the password to the registered password.

In a third embodiment, an authentication method of an electronic device. The method receives a plurality of key inputs from a user via activation of input keys. The method further validates at least one key input from the key inputs based on a predefined criterion to obtain a password. The method then compares the password to a registered password.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIGS. 5A-5E are illustrations of an exemplary transition of display screens during an authentication process according to an embodiment of the disclosure.

FIGS. 6A-6H are illustrations of an exemplary transition of display screens during an authentication process according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, a cell phone. Embodiments of the disclosure, however, are not limited to such cell phones, and the techniques described herein may also be utilized in other applications. For example, embodiments may be applicable to digital books, digital cameras, electronic game machines, digital music players, personal digital assistance (PDA), personal handy phone system (PHS), lap top computers, mobile navigation devices, mobile AV devices, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
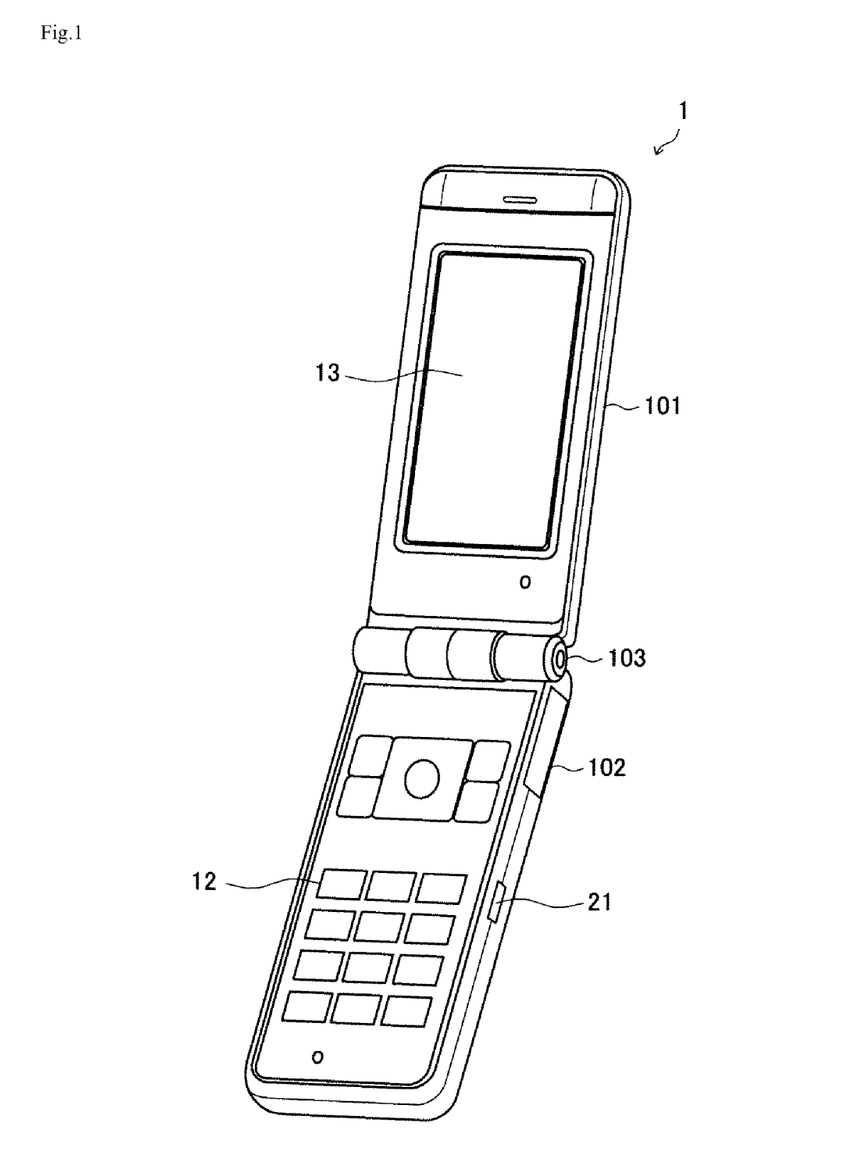
FIG. 1 is perspective view of an external appearance of a cell phone according to an embodiment of the disclosure.

FIG. 1 is a perspective view of an external appearance of a cell phone 1 according to an embodiment of the disclosure. The cell phone 1 comprises an upper housing 101, a lower housing 102 and a hinge module 103.

The upper housing 101 and the lower housing 102 are substantially the same size. The upper housing 101 and the lower housing 102 may have a rectangular shape, and the like. The upper housing 101 and the lower housing 102 are linked by the hinge module 103. The upper housing 101 and the lower housing 102 can transition between an open state and a closed state by means of a linkage using the hinge module 103.

The upper housing 101 and the lower housing 102 are in the open state in FIG. 1. The upper housing 101 comprises a display module 13. The lower housing 102 comprises a plurality of input keys of the operation module 12.

Figure 2:
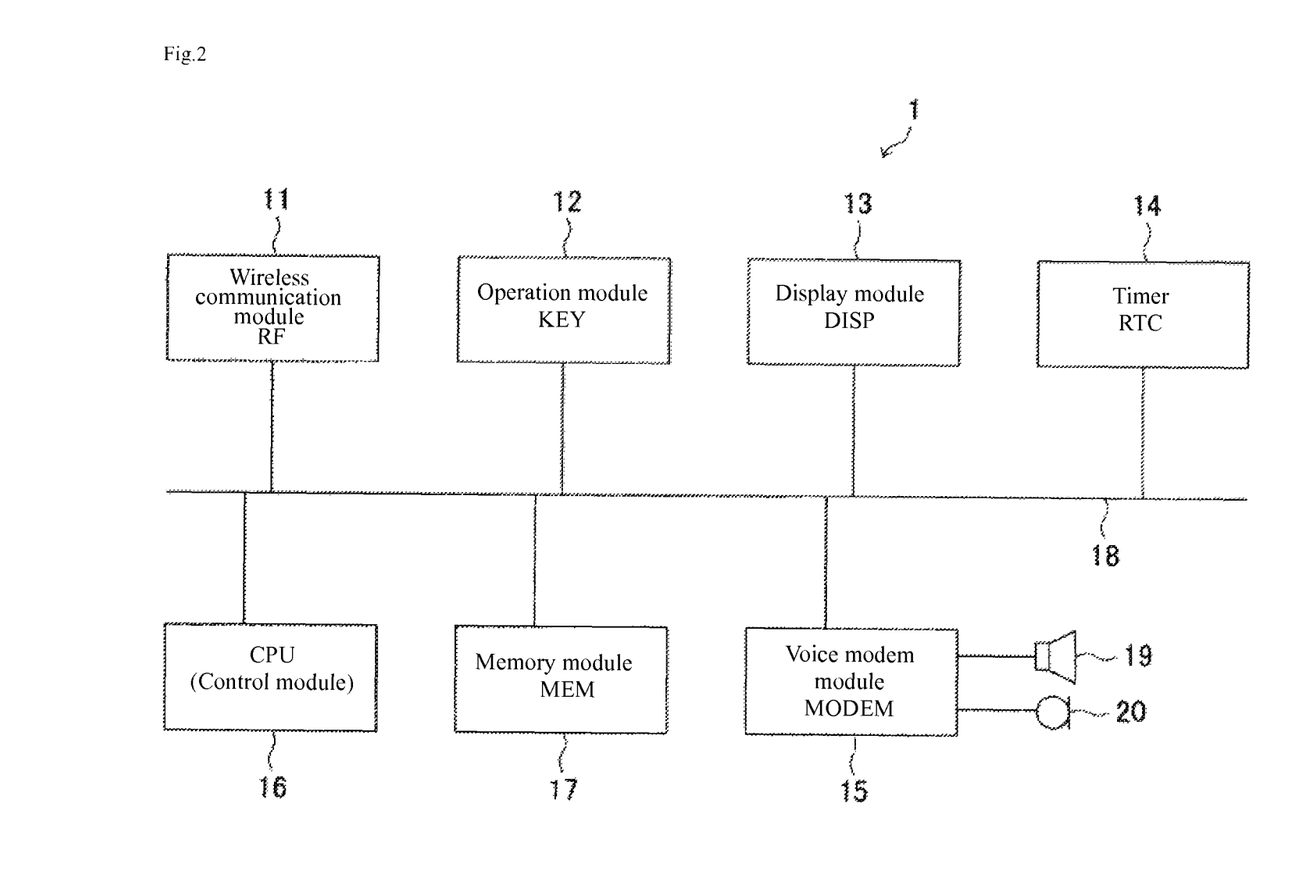
FIG. 2 is an illustration of an exemplary functional block diagram of a cell phone according to an embodiment of the disclosure.

FIG. 2 is an illustration of an exemplary functional block diagram of a cell phone 1 according to an embodiment of the disclosure. The cell phone 1 comprises, a wireless communication module 11 (RF), an operation module 12 (KEY), the display module 13 (DISP), a timer 14 (RTC), a voice modem module 15 (MODEM), a Central Processing Unit (CPU) 16 (control module 16), a memory module 17 (MEM), and a system bus 18 for coupling these components.

The wireless communication module 11 is operable to transmit and receive a plurality of communication signals comprising data signals via a base station (not shown). The wireless communication module 11 communicates with the wireless network via a wireless data communication link (not shown). The wireless communication module 11 cooperates with a base station transceiver (not shown) with a suitably configured RF antenna arrangement (not shown) that can support a particular wireless communication protocol and modulation scheme to transmit and receive the data signals. The data signals may comprise, for example but without limitation, voice data during voice communication, text data during email, web data during accessing web site, and the like.

The operation module 12 comprises a plurality of input keys (a first input module).

Figure 3:
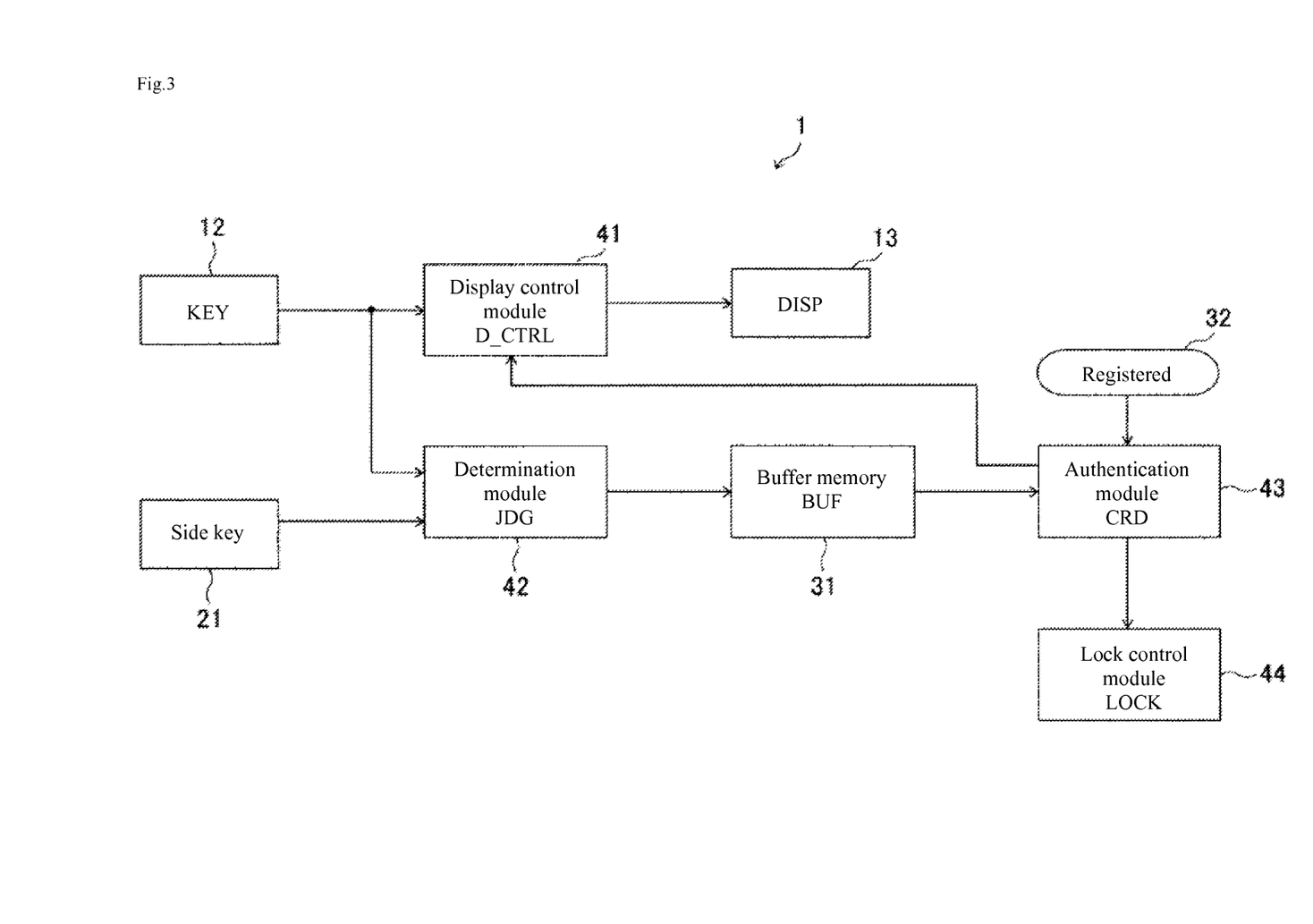
FIG. 3 is an illustration of an exemplary functional block diagram showing an authentication process according to an embodiment of the disclosure.

In addition the cell phone 1 comprises, a designated key such as a side key 21 (an input module) shown in FIGS. 1 and 3. However, any other key, touch panels, or the like, located at any other location on the cell phone 1 may also be used as the designated key. The input keys comprising, a numerical key, power key, speaking key, number key, character key, transmission key, etc. The operation module 12 may be located on the front surface of the lower housing 102. The side key 21 may be located on the side surface of the lower housing 102.

The operation module 12 outputs input data (input information) from the input key or side key 21 to the CPU 16. In this manner, the input key may be activated by the user to send the key input/input data to the CPU 16.

The display module 13 comprises, for example but without limitation, a liquid crystal display (LCD), organic electroluminescence (EL), an organic light emitting diode (OLED), and the like. The LCD or organic EL device is located on the front surface of the upper housing 101. The display module 13 displays the display data input/input key from the CPU 16. The display module 13 comprises a LCD and has a function to display images such as characters and digits on the LCD based on instructions from the control module 16. The display module 13 may accept the key input from the user to input and transmit data, and input operation commands for functions provided in the cell phone 1. The display module 13 accepts the operation command from the input keys, touch panels, and the like, and outputs operation command information to the control module 16 in response to the accepted operation command. Various kinds of information can be displayed on the display module 13 via an image/video signal supplied from the control module 16. In addition, the display module 13 has a function to display markers 51 as described below in the context of discussion of FIG. 5.

The timer 14 counts a clock time and elapsed time. For example, the timer 14 counts the elapsed time from a start clock time of receiving a streaming signal. The elapsed time counted by the timer 14 is output to the CPU 16.

The voice modem module 15 is coupled to the speaker 19 and the microphone 20. The voice modem module 15 receives a sample of a voice input to the microphone 20 and outputs a voice data to the CPU 16. The voice modem module 15 outputs the voice data input from the CPU 16 to the speaker 19.

The speaker 19 plays back the voice data input from the CPU 16. For example, the speaker 19 plays back the voice data contained in the streaming signal input from the CPU 16.

The memory module 17 may be any suitable data storage area with suitable amount of memory that is formatted to support the operation of the cell phone 1. Memory module 17 is configured to store, maintain, and provide data as needed to support the functionality of the cell phone 1 in the manner described below. In practical embodiments, the memory module 17 may comprise, for example but without limitation, a non-volatile storage device (non-volatile semiconductor memory, hard disk device, optical disk device, and the like), a random access storage device (for example, SRAM, DRAM), HDD, or any other form of storage medium known in the art. The memory module 17 may be coupled to the control module 16 and configured to store, for example but without limitation, buffer data and a registered password 32.

The memory module 17 may store, for example but without limitation, input from a user to the cell phone 1. In one embodiment, the memory module 17 comprises a buffer memory 31 that stores the buffer data. The buffer memory 31 extracts an input data/key input that is determined to be valid by a determination module 42 and stores an extracted input data. Thus, input data strings constructed from a plurality of input data are stored in the buffer memory 31. The memory module 17 may also store, a computer program that is executed by the control module 16, an operating system, an application program, tentative data used in executing a program processing, and the like. The memory module 17 may store installed programs downloaded form a transmission media such as the Internet. The memory module 17 may be coupled to the control module 16 such that the control module 16 can read information from and write information to the memory module 17. As an example, the control module 16 and memory module 17 may reside in their respective ASICs. The memory module 17 may also be integrated into the control module 16. In an embodiment, the memory module 17 may comprise a cache memory for storing temporary variables or other intermediate information during execution of instructions to be executed by the control module 16.

A plurality of data lines up in the input data string in an order in which the input data is received. The registered password 32 is a code that is registered by the user beforehand. The registered password 32 is a plurality of input data/key input acquired by the input key operation by the user during the registration. The registered password 32 is used in case performing the authentication process.

The control module 16 is configured to support functions of the cell phone 1. For example, the control module 16 may control operations of the cell phone 1 so that processes of the cell phone 1 are suitably performed. These processes may comprise, for example but without limitation, control of input/output signals to/from the input keys, validating/invalidating the key input from the input key as part of a password based on the predefined criterion, authenticating the password, performing control to display objects on the display module 13, and the like. In this manner, the control module 16 performs an authentication process as explained in more detail below.

The control module 16 also accesses the memory module 17 such as access to the buffer data and the registered password 32. The control module 16, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the control module 16 comprises processing logic that is configured to carry out the functions, techniques, and processing tasks associated with the operation of cell phone 1.

FIG. 3 is an illustration of an exemplary functional block diagram showing a system 300 used for authentication process according to an embodiment of the present disclosure. The system 300 comprises a display control module (D_C-TRL) 41, a determination module (JDG) 42, an authentication module (CRD) 43, and a lock control module (LOCK) 44.

The input data/key input that is obtained by activating the input keys of the operation module 12. The input data is input to the display control module 41. Subsequently, the display control module 41 generates display data for the user authentication password input screen in case the operation module 12 is initially activated. This display data is output to the display module 13.

The display module 13 displays the user authentication password input screen based on the display data for the input screen.

The display control module 41 displays, on the display module 13, a mark indicating the input key is activated in response to activation of the input key. That is, the display module 13 displays a mark corresponding to the operation of the input key by the user.

The determination module 42, based on a specified criterion, determines whether the input data (key input) that is obtained by activation of the input key is valid or invalid for performing the user authentication process. The determination is performed every time an input key outputs the input data corresponding to the activation of the input key by the user. For example, in case the input key is activate/pressed after (preferably, substantially immediately after) the side key 21 outputs its input data, the determination module 42 assumes that a predefined criterion is met, and determines that the input data output by the activated input key is invalid. In other words, in case the side key 21 is activated, even if the input key is activated, the determination module 42 determines not to use the input data as for authentication. On the other hand, in case the input key is activated while the side key 21 is not activated, with or before activation of the input key, the determination module 42 determines that a predefined criterion is met, and determines that the input data output by the activated input key is valid.

In other words, in a case in which the side key 21 is not activated, if the input key is activated, the determination module 42 uses the input data for authentication.

The determination module 42 stores the input data/key input that is determined to be valid in the buffer memory 31 as an input data string.

The authentication module 43 performs the user authentication. In this manner, the authentication module 43 reads the input data string that is stored in the buffer memory 31. The authentication module 43 also reads the registered password 32 that is registered in the memory module 17. The authentication module 43 then determines whether the input data string matches the registered password 32. If the input data string matches the registered password 32, the authentication module 43 outputs the authorization data to the lock control module 44. If the input data string does not match the registered password 32, the authentication module 43 does not output the authorization data to the lock control module 44.

The lock control module 44 manages the availability of the function of cell phone 1. The lock control module 44, for example, locks the function of the cell phone 1 in case the cell phone 1 is not used for a predetermined time. That is, the function of the cell phone 1 becomes unavailable. The lock control module 44 unlocks the function of the cell phone 1 in case the authorization data is input from the authentication module 43. In case the function of the cell phone 1 is unlocked, the function of the cell phone 1 becomes available.

Figure 4:
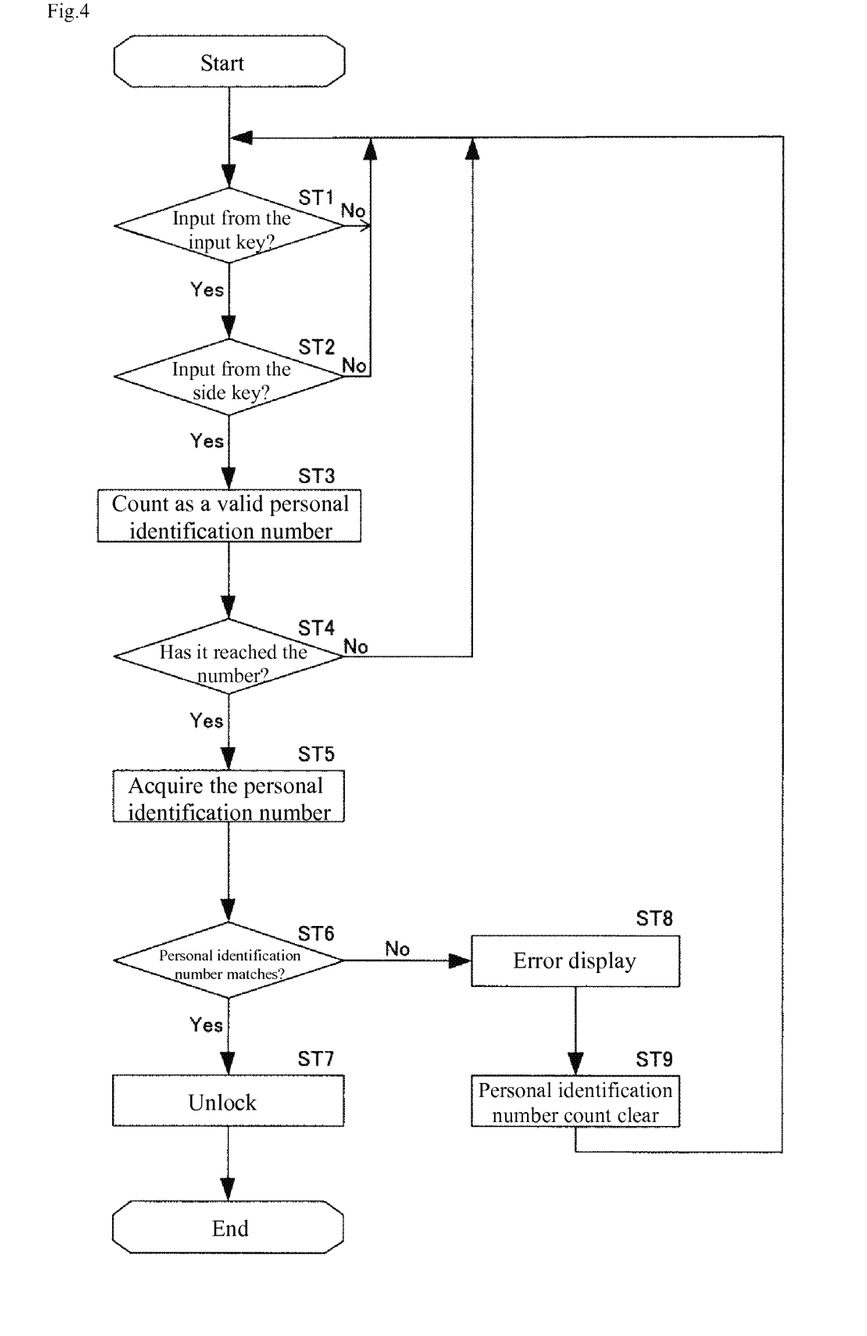
FIG. 4 is an illustration of an exemplary flow chart showing an authentication process according to an embodiment of the disclosure.

FIG. 4 is an illustration of an exemplary flow chart showing an authentication process 400 according to an embodiment of the present disclosure. The various tasks performed in connection with the process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a CPU such as the control module 16 in which the computer-readable medium is stored. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. For illustrative purposes, the following description of process 400 may refer to elements mentioned above in connection with FIGS. 1-2. In practical embodiments, portions of process 400 may be performed by different elements of the cell phone 1. The process 400 may have functions, material, and structures that are similar to the embodiments shown in FIGS. 1-3. Therefore common features, functions, and elements may not be redundantly described here.

In case the input key is activated/pressed while a function of the cell phone 1 is locked, the CPU 16 starts the user authentication process (task ST1).

Next, the determination module 42 determines whether the input data that is obtained from the input key is valid or invalid. Specifically, the determination module 42 determines whether an input from the side key 21 was received substantially immediately, before the key input from the input key (task ST2).

If the input data from the side key 21 is input/received before (preferably substantially immediately before) the input data from the input key, the determination module 42 determines that the input data from the input key is invalid (task ST2/No).

The determination module 42 returns to a waiting state to wait for receiving an input data via next operation of the input key (task ST1).

If the input data from the side key 21 is not input substantially immediately before the input data from the input key, the determination module 42 determines that the input data is valid (task ST2/Yes). The determination module 42 stores the valid input data in the buffer memory 31 as an input data string.

The determination module 42 uses the input data of the input key as a valid personal identification number (task ST3).

The determination module 42 determines whether characters/digits in the input data string of the input data has reached a number of characters/digits of the registered password 32 (task ST4) previously stored.

If it is determined that the number of digits is not reached the number of digits of the registered password 32 (task ST4/No), the determination module 42 returns to a waiting state for the input data from a subsequent input key (task ST1).

If it is determined that the number of characters is reached the number of characters of the registered password 32 (task ST4/Yes), the determination module 42 instructs the authentication module 43 to perform an authentication process.

The authentication module 43 reads the input data string stored in the buffer memory 31.

The authentication module 43 reads the registered password 32 from the memory module 17 (task ST5).

The authentication module 43 compares the read input data string to the registered password 32 (task ST6).

In case the input data string matches the registered password 32 (task ST6/Yes), the authentication module 43 outputs the authorization data to the lock control module 44.

The lock control module 44 unlocks the function of the cell phone 1 on the basis of the authorization data (task ST7).

If the input data string does not match the registered password 32 (task ST6/No), the authentication module 43 does not output the authorization data to the lock control module 44. Therefore, the lock control module 44 keeps locking the function of the cell phone 1.

Moreover, if the input data string does not match the registered password 32, the authentication module 43 instructs the display control module 41 to perform an error display. The display control module 41 generates a display data for displaying an error display screen.

The display control module 41 displays the error display screen on the display module 13 based on the generated display data (task ST8).

The authentication module 43 deletes the input data string stored in the buffer memory 31 (task ST9).

Subsequently, the cell phone 1 undergoes the waiting state for the input data of the input key from the determination module 42 (task ST1).

Figure 5:
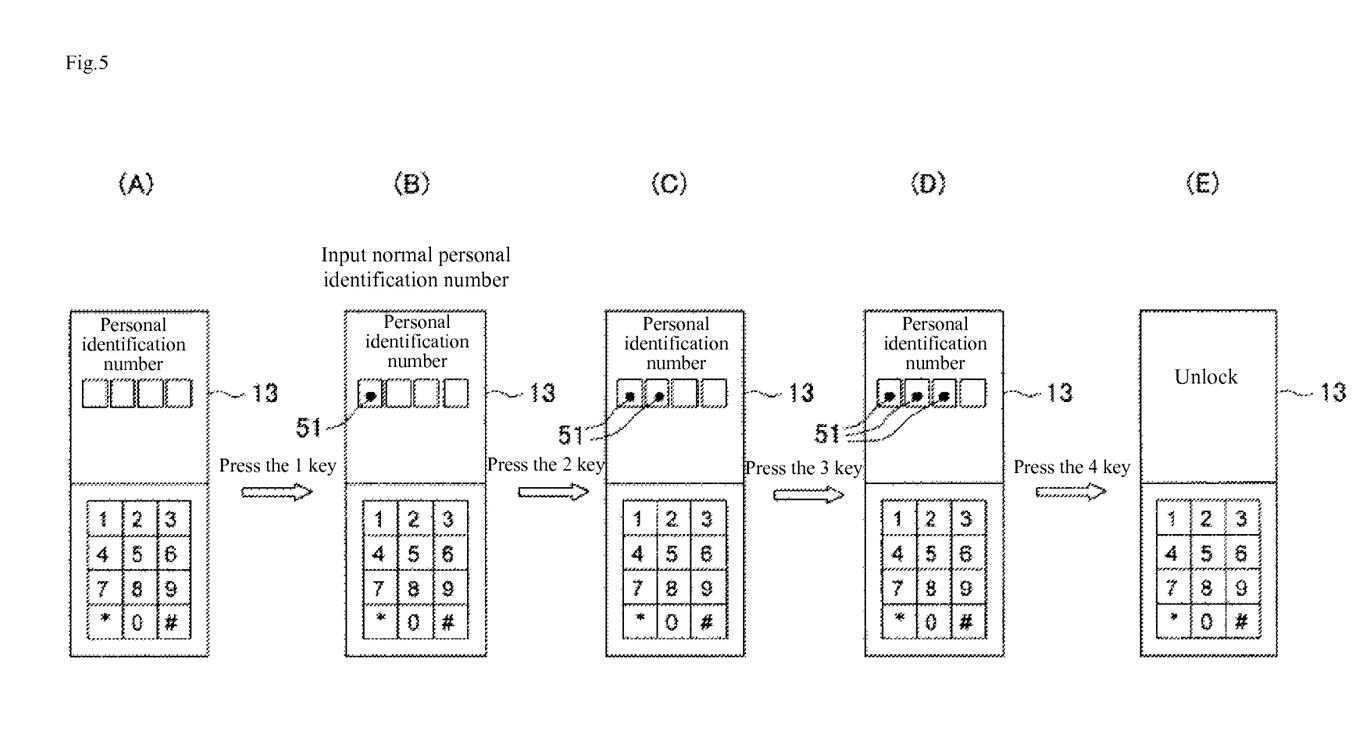
Figure 6:
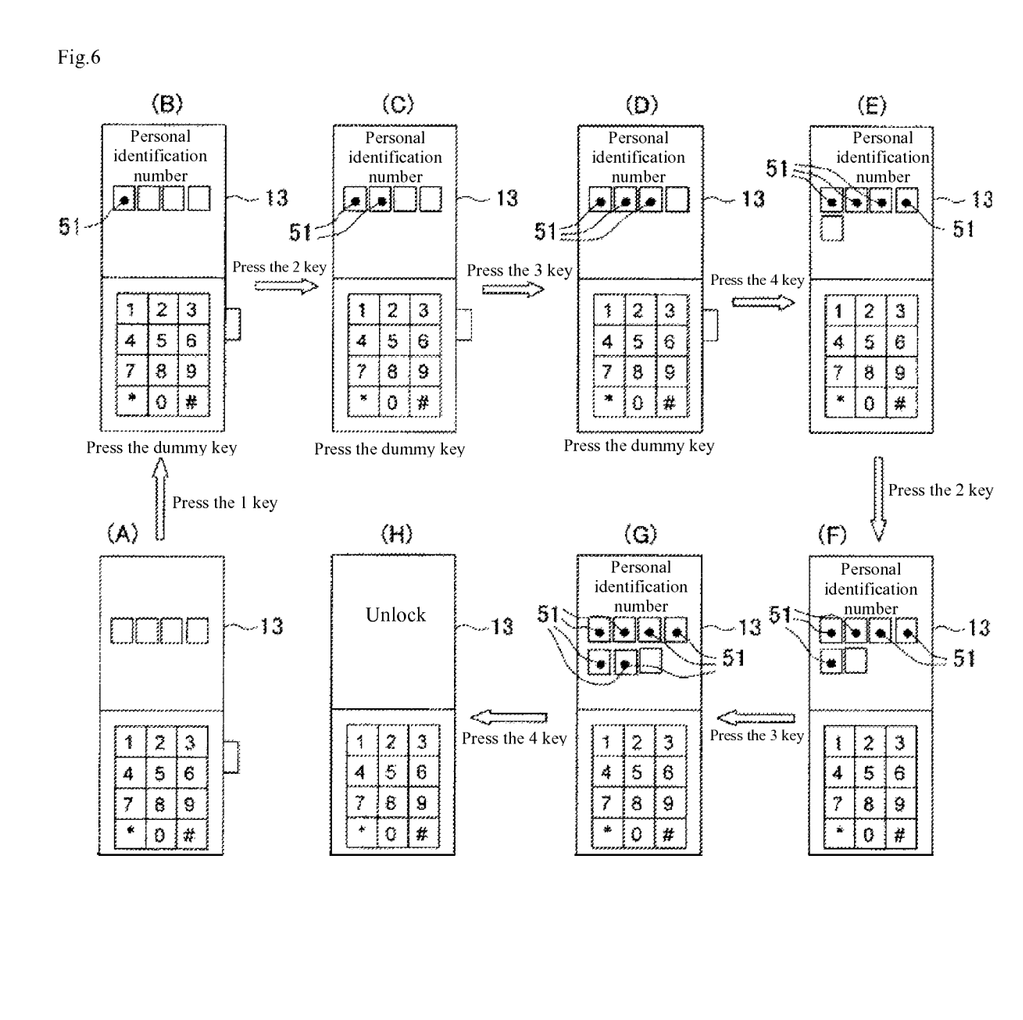

FIG. 5 and FIG. 6 show a transition of display module 13 of the cell phone 1 during the user authentication process in FIG. 4. FIGS. 5A-5B is an example of input screen transition in case an operation of inputting the registered password 32 is performed. FIG. 6 is an example of input screen transition in case the side key 21 is activated at a time of performing the operation of inputting the registered password 32. FIG. 5 and FIG. 6 show an example in which a four-digit registered password 32 "1234" is registered.

As shown in FIG. 5A, the display control module 41 displays the input screen for user authentication password on the display module 13. In case the input key "1" is activated, as shown in FIG. 5B, the display control module 41 displays one input mark 51 on the display module 13.

Next, In case the input key "2" is activated, as shown in FIG. 5C, the display control module 41 displays two input marks 51 on the display module 13.

Next, In case the input key "3" is activated, as shown in FIG. 5D, the display control module 41 displays three input marks 51 on the display module 13.

Next, In case the input key "4" is activated, the user is authenticated with this four-digit input "1234" and the cell phone 1 becomes usable.

The display control module 41 displays unlock as shown in FIG. 5 E.

As shown in FIG. 6 A, the display control module 41 displays the input screen for user authentication password on the display module 13.

Then, In case the input key "1" is activated, as shown in FIG. 6 B, the display control module 41 displays one input mark 51 on the display module 13.

Next, In case the input key "2" is activated after the side key 21 is activated, as shown in FIG. 6C, the display control module 41 displays two input marks 51 on the display module 13.

Next, In case the input key "3" is activated after the side key 21 is activated, as shown in FIG. 6 D, the display control module 41 displays three input marks 51 on the display module 13.

Next, In case the input key "4" is activated after the side key 21 is activated, as shown in FIG. 6E, the display control module 41 displays four input marks 51 on the display module 13.

Next, In case the input key "2" is activated without the side key 21 being activated, as shown in FIG. 6F, the display control module 41 displays five input marks 51 on the display module 13.

Next, In case the input key "3" is activated without the side key 21 being activated, as shown in FIG. 6 G, the display control module 41 displays six input marks 51 on the display module 13.

Next, In case the input key "4" is activated without the side key 21 being activated, as shown in FIG. 6H, the display control module 41 displays unlock.

Figure 7:
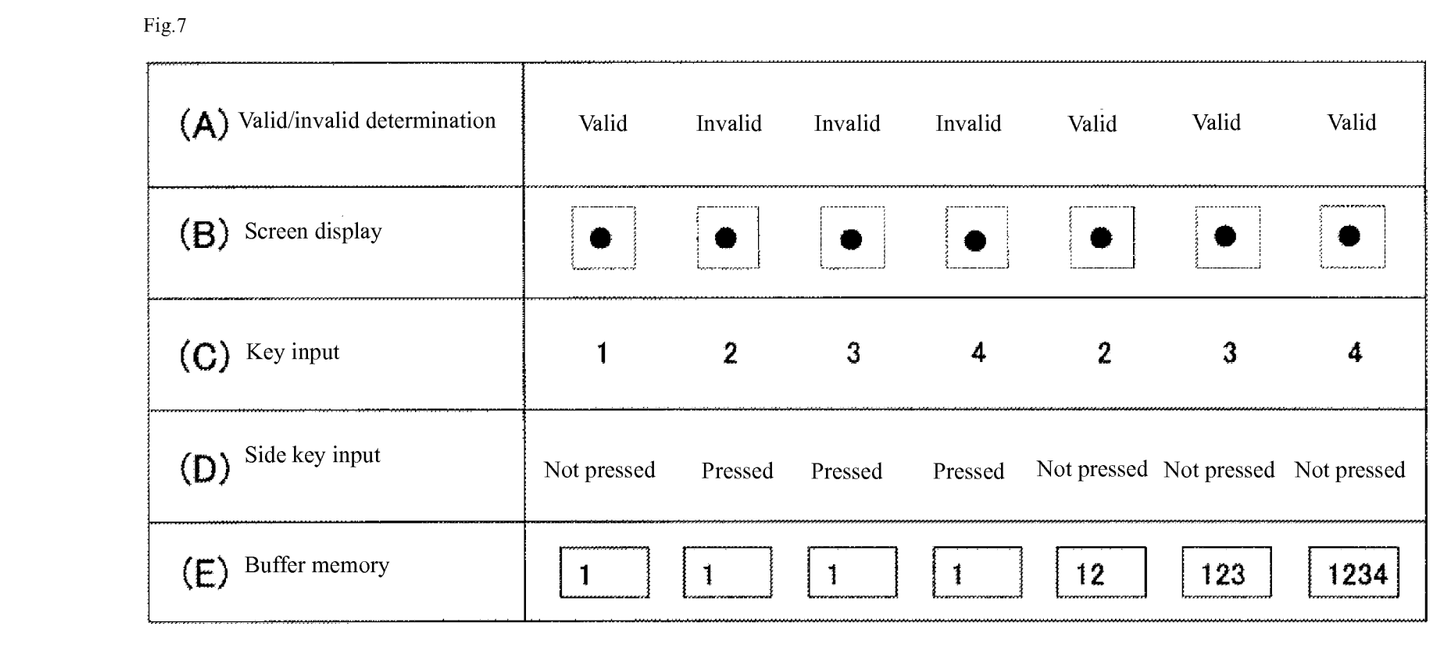
FIG. 7 is an illustration of an exemplary diagram showing state changes of a cell phone according to an embodiment of the disclosure.

FIG. 7 is an illustration of an exemplary diagram showing state changes of a cell phone according to an embodiment of the present disclosure. FIG. 7 shows the state changes of the cell phone 1 In case the operation shown in FIG. 6 is used in the user authentication process.

Row A shows results of determining whether the input data is valid or invalid for respective operations of the input key. Row B shows input marks displayed on the display. Row C shows input data output from the input key.

Row D shows a presence of the operation/activation of the side key 21. Row E shows accumulation of an input data string stored in the buffer memory 31.

As explained with reference to FIG. 6, the side key 21 is pressed before the input operation of the second to fourth input keys.

Then a total of seven operations/activations are performed on the input key 1. In this case, the determination module 42 determines that the first, fifth, sixth and seventh input data input to be valid. Then, the input data determined to be valid is stored in the buffer memory 31 as an input data string (in this case, "1234" is stored as an input data string). The authentication module 43 compares this input data string "1234" to the registered password 32 "1234". Since both match, the lock control module 44 unlocks the function. Therefore, the user can use the cell phone 1.

In this way, the cell phone 1 performs the authentication process by comparing a password to the registered password 32 based on input information according to a key input that meets a criterion in which the operation/activation of the side key 21 is not performed before the input operation of the input key. Therefore, a unauthorized person who observes authentication process performed by the authorized person, cannot determine the registered password 32, unless the unauthorized person can distinguish the input data subjected to the authentication by the authentication module 43 from the input data that is not subjected to the authentication by the authentication module 43. In this manner, the likelihood of determining the registered password 32 by an unauthorized person is reduced.

In this embodiment, the cell phone 1 performs the authentication process according to the predefined criterion. In other words, in this embodiment, in case the side key 21 is activated, the determination module 42 determines the operation to be invalid. Therefore, the user (authorized person) can input the input data that is not subjected to the authentication by the authentication module 43 only by operating the side key 21 by slightly moving, for example, the thumb of the hand holding the cell phone 1.

In an embodiment, the display module 13 displays a plurality of marks that correspond to the number of operation of the input key as input marks indicating the number of digits of the input user authentication password, regardless of the results of determination by the determination module 42.

Therefore, others (unauthorized person) do not easily recognize the number of characters of the registered password even if they take a peak at the number of characters by the input mark displayed on the display module 13.

In an embodiment, in addition to the activation of the input key for the operation module 12, the determination module 42 may determine whether or not the input data obtained from a touch panel based on the operation of the touch panel is extracted as data for password comparison.

In case the input key is activated simultaneously with activation of the side key 21, the determination module 42 determines not to extract the input data from the input key for password comparison.

In case the side key 21 is activated at the same time as the input key, or the input key is activated immediately after the side key 21 is activated, the determination module 42 determines to extract the input data from the input key for password comparison. In this case, if the input key is activated without the operation of the side key 21, the determination module 42 determines not to extract the input data from the input key for password comparison.

The side key 21 may be provided to the lower housing 102 provided with the operation module 12, which is a housing different from the upper housing 101 provided with the display module 13. In this case, users do not need to move their hands to the upper housing 101 in case pressing the side key 21. Therefore, the possibility of the registered password 32 being known to others is further reduced.

Alternatively, the side key 21 may be provided on the back of the lower housing 102 or on the upper housing 101 of the cell phone 1.

An inclination sensor may be provided to the cell phone 1, and the determination module 42 determines whether to extract the input data obtained from the input key for password comparison based on the inclination measured by the inclination sensor.

The side key 21 may be provided on the surface of the touch panel as a soft key, or may be a key other than a numerical key, such as "#" key or "*" key, on the operation module 12.

In addition to numbers mentioned above, the password may comprise numbers, characters and symbols. In this case, the operation module 12 may be an operation key having QWERTY keys, etc.

In one embodiment, In case a certain key is continuously activated among a plurality of input keys, the determination module 42 determines that a the key is activated in accordance with a predefined criterion, and in case another key is activated after a certain key is activated only once not continuously, it may determine that the operation of the certain key is performed not in accordance with the predefined criterion. For example, in case an input is performed to the numerical keys on the operation module 12 in the order of "1 key", "1 key", "2 key", "3" key, "3" key, "4 key", and "4 key", the determination module 42 determines to extract, for the password comparison, the input data on "1 key", "3 key" and "4 key" that is continuously activated, and determines not to extract, for the password comparison, the input data on "2 key" that has been activated only once. That is, the authentication module 43 stores the input "1, 3, 4" in the buffer memory 31, and compares the input "1, 3, 4" stored in this buffer memory 31 to the registered password.

In this embodiment, in case a certain input key is activated continuously, the determination module 42 determines that the predefined criterion is met. The display control module 41 may display an input mark on the display module 13 every time the operation module 12 is activated via activation of the input keys.

In this way, if others take a peak at the authentication password input activation by the user of the cell phone 1, the actual number of characters of the authentication password is different from the number of input marks displayed on the display module 13; hence, the authentication password is not easily recognized by others.

Moreover, in case the display module 13 displays a displayed object that keeps switching between a displayed state and a hidden state at constant intervals (for example, a designation such as ":" that keeps blinking every second on a digital clock display), the determination module 42 determines that the input data output from the input key activated while the displayed object is being displayed to be valid, and may determine that the input data output from the input key activated while the displayed object is not being displayed to be invalid. Of course, the results of determining whether it is valid or invalid may be opposite from the above.

In this document, the terms "computer program product", "computer-readable medium", and the like may be used generally to refer to media such as, for example, memory, storage devices, or storage unit. These and other forms of computer-readable media may be involved in storing one or more instructions for use by the control module 16 to cause the control module 16 to perform specified operations. Such instructions, generally referred to as "computer program code" or "program code" (which may be grouped in the form of computer programs or other groupings), when executed, enable the display method of the cell phone 1. Signal carrier is also included in computer-readable medium.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An electronic device, comprising:
   a memory module configured to store executable programmed modules;
   an operational module comprising a plurality of input keys;
   at least one invalidation input key;
   a control module communicatively coupled to the memory module configured to execute programmed modules stored therein;
   an authentication module stored in the memory module and configured to be executed by the control module, the authentication module configured to:
   receive a plurality of key inputs from a user via activation of the input keys;
   invalidate at least one key input and display an input mark, if an input key associated with the at least one key input is activated after receiving an invalidation input associated with activation of the at least one invalidation input key from the user;
   validate at least one key input from the key inputs based on a predefined criterion to obtain a password; and
   compare the password to a registered password.

2. The electronic device according to claim 1, wherein the memory module stores the registered password.

3. The electronic device according to claim 1, further comprising a display module that displays the input mark in response to activation of each of the input keys regardless of whether the predefined criterion is met.

4. The electronic device according to claim 1, wherein the predefined criterion is based on a relationship between the at least one key input and an input to an input module.

5. The electronic device according to claim 4, further comprising a housing, wherein the input keys and the input module are located on different surfaces of the housing from each other.

6. The electronic device according to claim 1, wherein the predefined criterion is met, if the input key associated with the at least one key input is activated while a displayed object is displayed on a display module.

7. The electronic device according to claim 1, wherein the predefined criterion is met, if at least one of the input keys is continuously activated.

8. An electronic device, comprising:
   a housing;
   a plurality of input keys located on a front surface of the housing;
   a side key located on a side surface of the housing;
   a memory module configured to store executable programmed modules and a registered password; and
   a control module communicatively coupled to the memory module configured to execute programmed modules stored therein;
   an authentication module stored in the memory module and configured to be executed by the control module, the authentication module configured to:
   receive a plurality of key inputs from a user via activation of the input keys;
   invalidate at least one key input and display an input mark, if an input key associated with the at least one key input is activated after receiving an invalidation input associated with activation of the at least one invalidation input key from the user;
   validate at least one key input from the key inputs to obtain a password, if the side key is not activated before receiving the at least one key input; and
   compare the password to the registered password to obtain an authenticated password.

9. An authentication method of an electronic device comprising:
   receiving a plurality of key inputs from a user via activation of input keys, the input keys including at least one invalidation input key;
   invalidating at least one key input and displaying an input mark, if an input key associated with a key input is activated after receiving an invalidation input associated with activation of the at least one invalidation input key from the user;
   validating at least one key input from the key inputs based on a predefined criterion to obtain a password; and
   comparing the password to a registered password.

10. The method of claim 9, further comprising displaying the input mark in response to activation of each of the input keys regardless of whether the predefined criterion is met.

11. The method of claim 9, wherein the predefined criterion is based on a relationship between the at least one key input and an input to an input module.

12. An electronic device, comprising:
- a memory module configured to store executable programmed modules and a password;
- an operational module comprising a first key and a plurality of second keys;
- a control module communicatively coupled to the memory module configured to execute programmed modules stored therein;
- an authentication module stored in the memory module and configured to be executed by the control module, the authentication module configured to:
  - recognize at least one key input associated with activation of at least one second key, as an invalidated input, if the at least one second key is activated with activation of the first key;
  - recognize the at least one key input associated with activation of the at least one second key, as a validated input, if the at least one second key is activated without activation of the first key; and
- compare the password with an input string of the at least one key input regarded as the validated input to authenticate the password.

* * * * *